United States Patent [19]
Gallaher et al.

[11] 3,898,704
[45] Aug. 12, 1975

[54] CONVERTIBLE SEAT-BED EQUIPMENT

[75] Inventors: William C. Gallaher, San Clemente; Jerome P. Stephens, Orange; Phillip J. Testa, Norwalk; James E. Wein, Orange, all of Calif.

[73] Assignee: McDonnell Douglas Corporation, Santa Monica, Calif.

[22] Filed: July 18, 1974

[21] Appl. No.: 489,468

[52] U.S. Cl. .................. 5/2 R; 5/9 R; 244/118 P; 297/62
[51] Int. Cl.² .......................................... A47C 13/38
[58] Field of Search ............... 5/2, 6, 8, 59, 9, 118, 5/147, 17, 154, 18, 168; 105/314–316, 319, 322, 345 X; 244/118 P; 297/62, 354; 296/69

[56] References Cited
UNITED STATES PATENTS

| | | | |
|---|---|---|---|
| 1,387,083 | 8/1921 | Welch | 297/62 |
| 2,250,193 | 7/1941 | Emery, Jr. et al. | 297/62 |
| 2,947,350 | 8/1960 | Davis | 297/355 |
| 2,953,103 | 9/1960 | Bohannon et al. | 297/318 |

Primary Examiner—Casmir A. Nunberg
Attorney, Agent, or Firm—Robert O. Richardson; Walter J. Jason; Donald L. Royer

[57] ABSTRACT

Convertible Seat-Bed Equipment for converting a reclining seat into an upper and lower bunk bed in an aircraft cabin. From seat position the bottom and back pivot up and legs pivotally mounted on the back drop down to support the horizontally extended bottom and back to comprise the top bunk. A fastener on the bottom attaches to the adjacent wall. The bottom bunk comprises pivotally mounted sections which extend with one end resting on a cross-member on the legs of the upper bunk. The midsection is supported and secured on wall-mounted brackets which were used to support and secure the bottom of the seat when the seat position is used.

6 Claims, 4 Drawing Figures

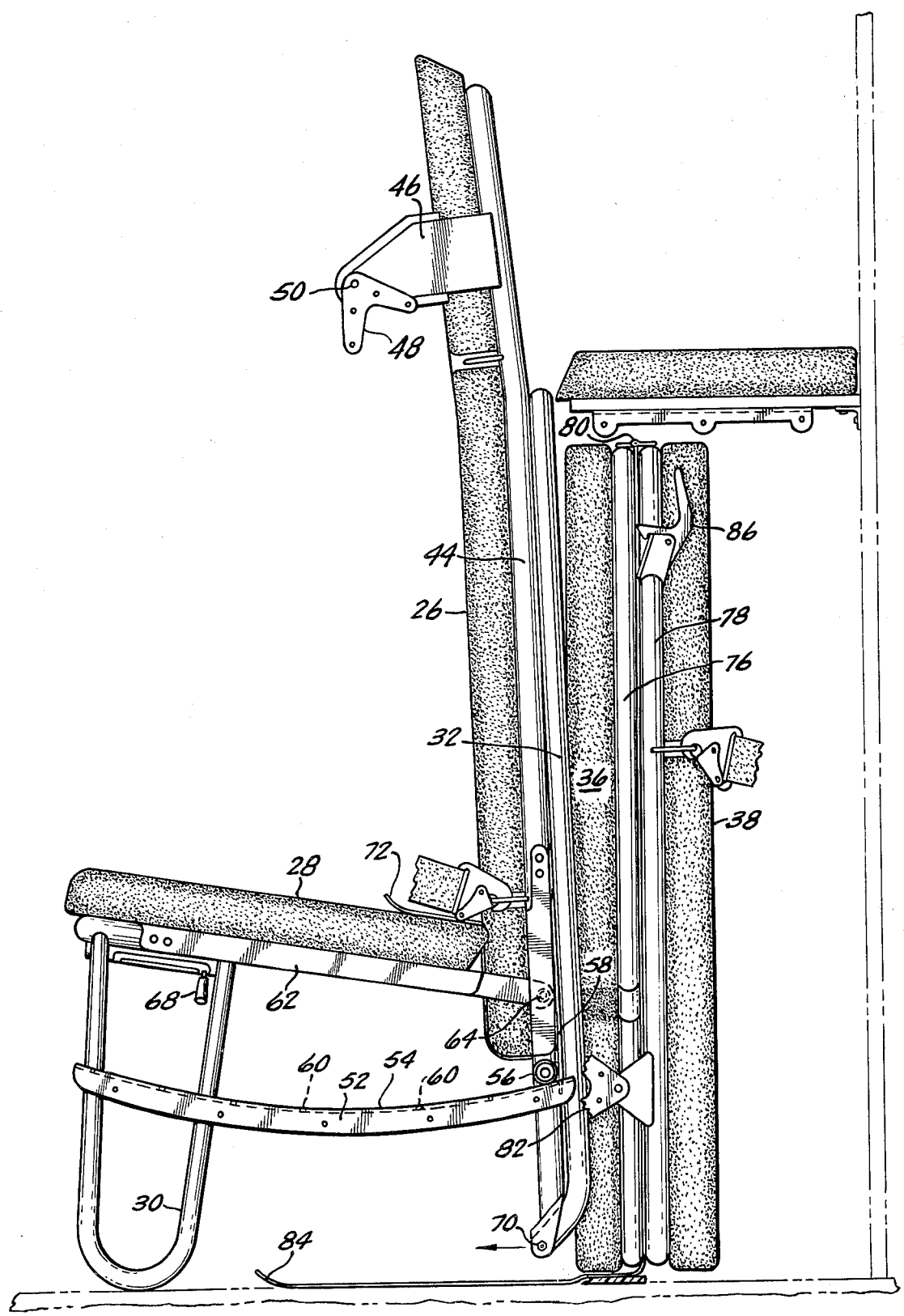

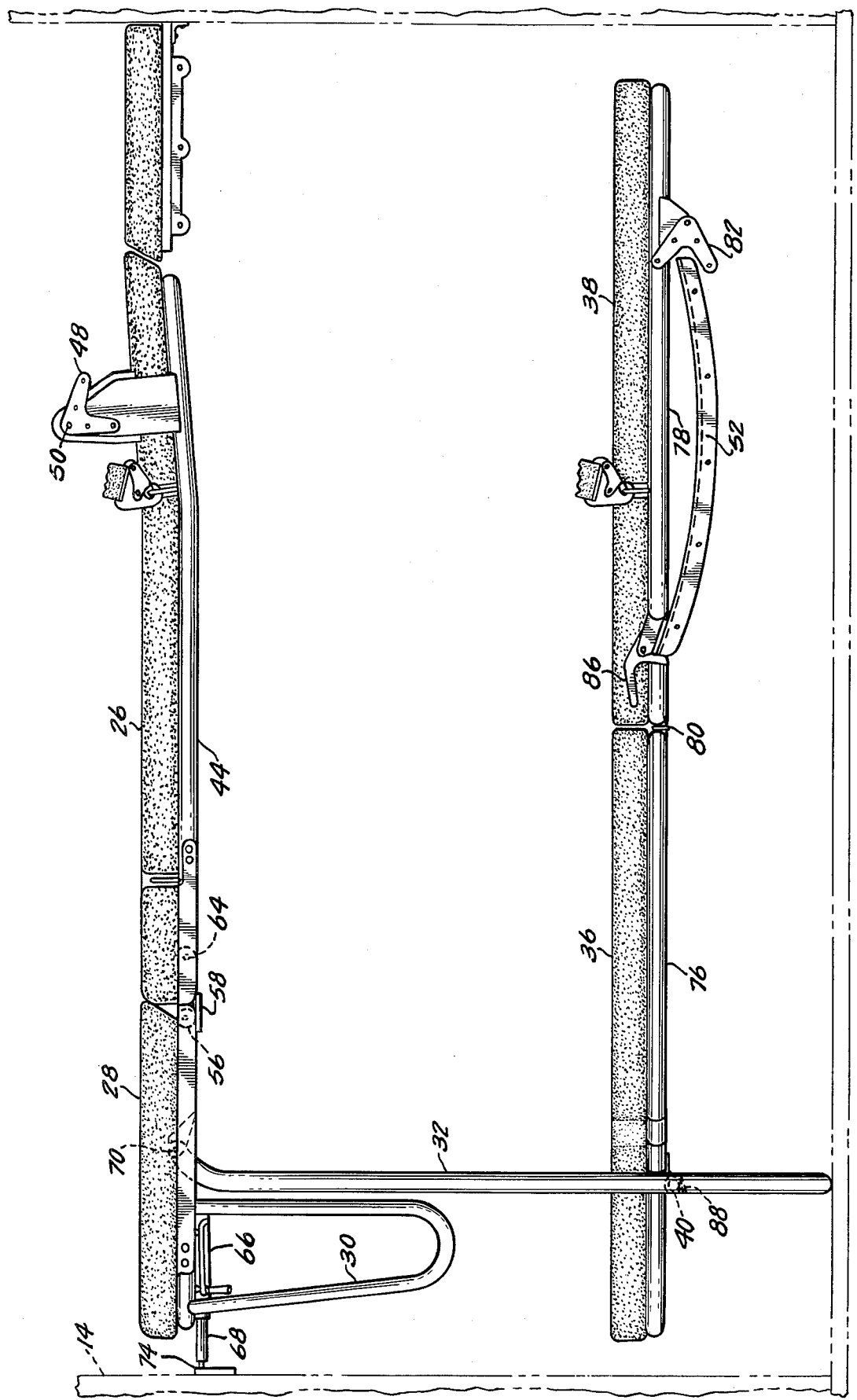

CONVERTIBLE SEAT-BED EQUIPMENT

BACKGROUND OF THE PRESENT INVENTION

As airplanes become larger and fly faster, more crew members are needed. When trips are longer, extra crew members are needed to relieve regular members from time to time. Also, on long flights one crew flies the plane to its destination and another crew flies it back while the first crew remains at the destination to fly another plane back. This excessive crew "down time" away from home leads to extra airline expenses in terms of salaries and accommodations. It thus has been determined that the use of double crews continuously on board the airplane would constitute a substantial saving to the airline. While members of one crew operated the airplane the other crew members on board may wish to relax, read, sleep and otherwise rest and be available for the next work period. In this manner an airplane flying from the United States to Europe or Asia, for example, may return with all crew members on board. Total time out for both crews is reduced and there is no crew lay-over expense as formerly.

For crew members to rest or sleep in privacy it is desirable that they not occupy regular passenger seats. Moreover, passenger seats normally are not adapted to convert into bunk beds. Also, in case of full load, reserving passenger seats for crew members results in a loss of revenue.

SUMMARY OF THE PRESENT INVENTION

In accordance with the present invention, provision has been made for installation of a convertible seat-bed for use of off-duty crew members in aircraft making relatively lengthy flights requiring two crews or in transporting extra crew members to or from duty assignment stations. In an illustrative example involving a wide-bodied jet transport having a passenger loading door in the forward part of the cabin there was formerly a small storage space just inside the door, on the left upon entering, and next to an attendant seat adjacent a galley wall. This space was of sufficient size to accomodate a seat. Across the doorway to the right, upon entering the aircraft, is a wall which is part of a storage closet. By adding a length equal to the width of the passenger loading door, there is space for conversion of the crew seat into a bed. In fact, bunk beds may be provided. This space is otherwise wasted space since it is unsuitable for passenger seats, and access must be had to the door in loading and discharging passengers when the plane is on the ground.

In one form the seat bottom and seat back are pivotally connected and the seat back is pivotally mounted near its upper end to the side walls of the compartment or other support. Arcuate rails are mounted on the side walls near the bottom, or other support, to which latches on the lower end of the back engage. Various detents on the arcuate rails are engageable to permit the seat bottom and lower end of the seat back to tilt forward for adjustable reclining seat positions. The front end of the seat bottom has legs for support throughout these positions.

Between the seat back and the rear wall of the compartment is space for the bottom bunk bed in fold-up position. The bottom bunk bed consists of two halves hinged together with the lower end of one pivotally mounted on the side walls of the compartment or other support. After the seat has been straightened out to form the upper bunk, the bottom bunk bed may be straightened out for its use.

A second set of legs is attached to a lower extension of the seat back and pivots upwardly behind the seat back when the seat position is used. When the seat bottom is raised to the bunk bed position, these legs pivot to the floor for support of the lower end or foot of the bed. The seat bottom and back are horizontal. A latch on one edge of the seat bottom attaches to the storage wall (across the doorway) against which the seat bottom abuts when in the bunk bed position. The lower bunk bed then may be folded out and the lower end placed on a cross bar near the lower end of the legs supporting the top bunk. This maintains the lower bunk in horizontal position.

The reverse of the above procedure restores the equipment to seat use again, freeing the doorway for passenger entrance and exit.

BRIEF DESCRIPTION OF THE DRAWINGS

FIG. 3 is a side elevational view of the equipment in seat position; and

FIG. 4 is a side elevational view of the equipment in bunk bed position.

DETAILED DESCRIPTION OF ILLUSTRATIVE EMBODIMENT

Figure 1:
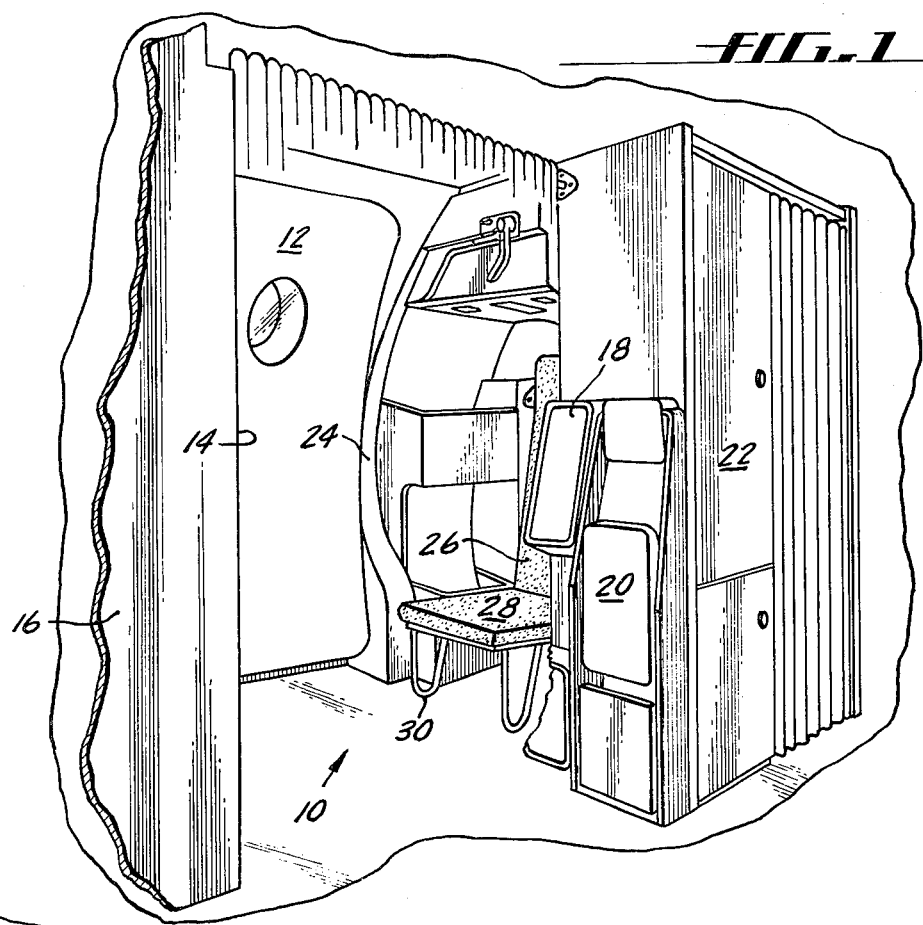
FIG. 1 is a persepctive view of the convertible equipment in seat position.

Referring now to FIG. 1 there is shown a portion 10 of the interior of a vehicle such as an aircraft having a door 12 through which passengers pass in boarding and leaving the plane. Looking toward the door 12 from within, there is a storage or work area on the left having an end wall 14 and a side wall 16. On the right is an attendant station including an operations console 18 where the control for lights, music volume, call button lights, etc., are located. There is also a fold-up cabin attendant seat 20 behind which is a storage compartment 22. Between this attendant station and the cabin wall 24 at the right of door 12 is a recessed area of space normally not suitable for the seating of a passenger. Sometimes this space or compartment was used for storage of passenger carry-on items such as smaller suitcases or packages. However, in accordance with the present invention this compartment has been converted with seat-bed equipment into a crew rest area to accommodate off-duty crew personnel with privacy away from the passenger area. As shown, there is installed a seat having a back 26, and a seat bottom 28 having legs 30 extending down from its front edge. While this particular compartment is near a door of a moving vehicle, it will be understood as further description is made of the convertible seat-bed equipment, that any minimum size area or compartment space may be used and the use of the present invention is not to be confined only to the type of compartment set forth in this illustration.

Figure 2:
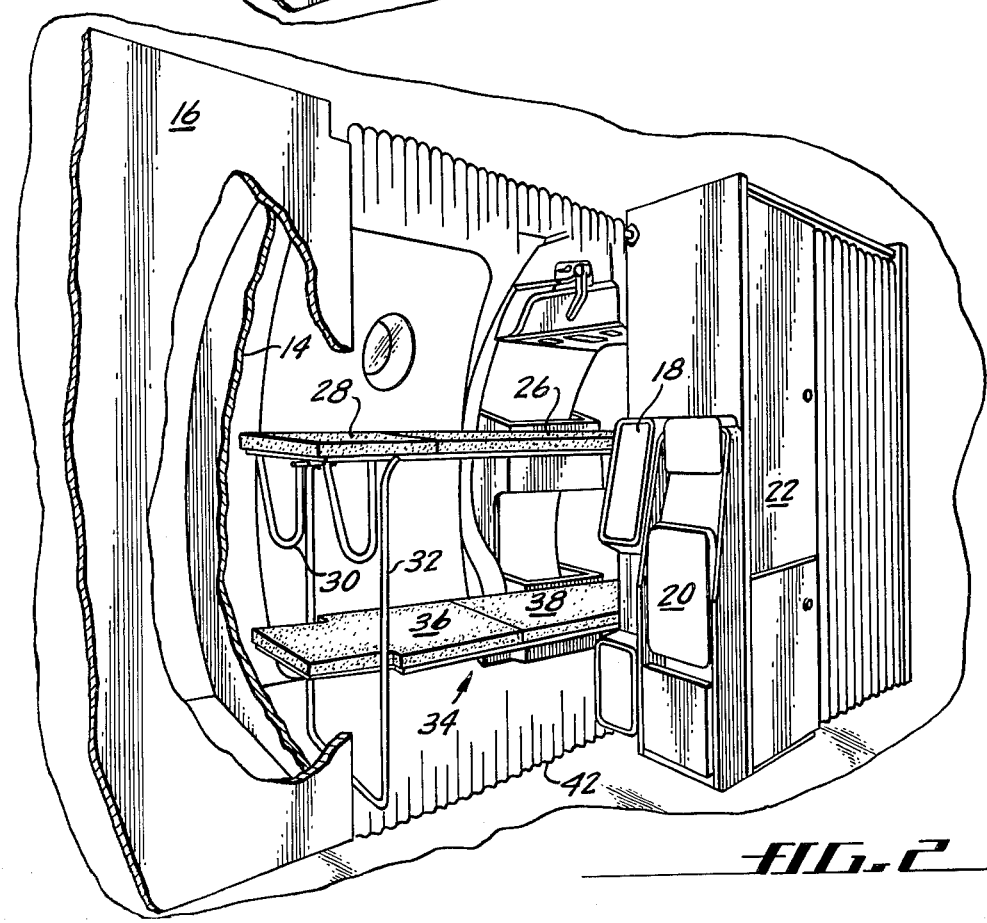
FIG. 2 is a perspective view of the convertible equipment in bunk beds position.

In FIG. 2 there is shown the same general area as in FIG. 1 but with the seat converted to a bed. This was done by moving the seat bottom 28 forwardly and upwardly. Seat back 26 pivots at its upper edge. Also, seat back 26 is hingedly connected to seat bottom 28. When the back and bottom are horizontal, a second and longer set of legs 32 is pulled down to hold that end of the upper bunk bed level with the other end which pivots on the compartment side walls. These legs pivot from an extension of the seat back 26 and extend upwardly behind the seat back in the seat position.

Also stored behind the seat back 26 in the seat position is the lower bunk 34 consisting of two half sections 36, 38 hingedly folded together with the hinged edges extending upwardly. Section 38 is pivotally mounted on the compartment side walls. After the seat bottom 28 and back 26 have been raised to upper bunk position, the lower edge of section 36 is pulled forwardly and placed over cross bar 40 on legs 32. This maintains the lower bunk 34 in horizontal position. If desired, a draw curtain 42 may be drawn for privacy when the bunks are in use. The structural details of the convertible seat-bed equipment are more fully described hereinafter with reference to other Figures.

Referring now to FIG. 3 there is shown in side view the seat-bed equipment in the seat position. At the upper end of the seat back frame 44, to which seat back 26 is affixed, are forwardly extending ears 46 which are pivotally mounted on mounting brackets 48. These brackets are mounted on the compartment side walls and define a pivot axis 50 about which the seat back pivots, both for reclining adjustment and for conversion to upper bunk position. Also mounted on the compartment side walls near the floor is a pair of arcuate tracks 52. These tracks have a roller supporting top surface 54 curved on a radius about pivot 50. On seat back frame 44 near its lower end are a pair of rollers 56 which roll over surface 54 as the lower end of frame 44 is swung forwardly. A spring-loaded pivotal latch 58 on frame 44 engages selected notches 60 in tracks 52 to maintain frame 44 in the desired inclination for occupant comfort. When adjustment is desired the latch is freed from the notch and the seat manually pushed along the track to the new position.

Seat bottom 28 has a seat frame 62 pivotally mounted to frame 44 at pivot point 64 which is above the lowermost end of frame 44. A pair of legs 30 support the front end of seat bottom 28 in the seat position as shown. Also mounted on seat frame 62 is a bolt latch 66 with plunger 68 movable forwardly to engage an aperture in end wall 14 when the seat is in bunk bed position. Also, at the lower end 70 of seat back frame 44 is pivotally mounted a pair of legs 32 which fold up behind seat back frame 44. These legs are longer and are used to support the back frame in horizontal position when used in upper bunk bed position. A pull strap 72 at the rear of seat bottom 28 may be used to facilitate forward movement for bunk bed conversion.

Before describing the lower bunk in folded position in FIG. 3, a description of the seat extended to upper bunk as shown in FIG. 4 should be made. By releasing latch 58 from notches 60 on track 52 and by pulling on strap 72, the lower end of frame 44 may be rotated and raised to a position level with the top portion of frame 44. Legs 32 are then pivoted downwardly to engage the floor and hold seat bottom 28 at the proper elevation. Plunger 68 on latch 66 is then moved forward into aperture 74 in end wall 14. This restricts side movement of the upper bunk. Also, by having legs 32 mounted on the end 70 of seat back frame 44 beyond the pivotal connection 64 of back frame 44 with bottom frame 62, sagging is avoided.

Referring back to FIG. 3, the lower bunk 34 consists of half sections 36, 38. These sections have support frames 76, 78 pivotally connected at 80 at their upper ends. Frame 78 is pivotally mounted near its lower end to brackets 82 which are affixed to the compartment side walls. A pull strap 84 at the lower end of frame 76 facilitates withdrawal of the lower end of frame 76. This pivots the inner frame 78 about its pivot point 80. A spring-loaded latch 86 near the upper end of frame 78 is adapted for engagement with the outer end of arcuate track 52 for support when the conversion is made into a lower bunk bed as shown in FIG. 4. Frame 76 rests on cross bar 40 on legs 32 and has a bracket 88 that engages the cross bar to hold the frame firm.

Reconversion from bunk beds back to a crew seat commences with disengaging latch 86 from track 52 and raising upwardly on frame 76 near its hingeline 80. The two sections 36, 38 fold up as section 38 pivots upwardly about its mounting bracket 82. Thereafter, plunger 68 of latch 66 is removed from opening 74 and legs 32 are pivoted and latched up against seat back frame 44. As frame 44 swings downwardly around pivotal brackets 48, the rollers 56 on seat back frame engage the top of surface 50 and roll rearwardly. Seat bottom legs 30 engage the floor. The seat bottom 28 may be moved rearwardly until latch 58 engages a desired one of the notches 60.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, for various obvious modifications may occur to persons having ordinary skill in the art.

What is claimed is:

1. A convertible seat-bed equipment for converting a reclining seat into a bed comprising:
   a seat back frame pivotally mounted at a pivot point near the top thereof to a wall;
   a seat bottom frame pivotally connected at the rear end thereof to said seat back frame;
   arcuate rails on said wall;
   rollers on said seat back frame engageable with said rails as said seat bottom frame is moved fore and aft to desired seat back frame inclination;
   said arcuate rails having a roller engaging surface, points thereon of which are of equal distance from said seat back frame pivot point.

2. A convertible seat-bed equipment as in claim 1, and legs pivotally mounted to the lower end of said seat back frame, said legs being foldable upwardly behind said seat back frame in seat position and extending downwardly to support said seat back frame horizontally in bed position.

3. A convertible seat-bed equipment as in claim 3 wherein said legs are pivotally attached to said seat back frame below the pivotal connection of said seat bottom frame with said seat back frame when in seat position.

4. A convertible seat-bed equipment as in claim 4, and latching means on said seat bottom frame for engagement with an end wall when in bed position.

5. A convertible seat-bed equipment as set forth in claim 1 wherein said rails have recesses therein and said seat back frame has a latching means engageable with selected recesses, thereby to adjust the angular inclination of said seat back frame in seat position.

6. A convertible seat-bed equipment as set forth in claim 1, and a pair of bunk bed half sections pivotally connected and folded together with their pivotal connection extending upwardly;

one of said half sections being pivotally mounted on said wall;

latching means on said one half section for engagement with said arcuate rails when folded out to bed position;

legs maintaining said seat back frame substantially in horizontal position when converted into a top bunk bed;

a cross-member on said legs to receive and support the other of said half sections in substantially horizontal position when folded out for use as a lower bunk bed.

* * * * *